United States Patent
Lee et al.

(10) Patent No.: US 8,970,575 B2
(45) Date of Patent: Mar. 3, 2015

(54) POWER SOURCE CIRCUIT AND LIQUID CRYSTAL DISPLAY APPARATUS HAVING THE SAME

(75) Inventors: Jong-Jae Lee, Asan-si (KR); Chang-Soo Lee, Cheonan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 662 days.

(21) Appl. No.: 12/874,823

(22) Filed: Sep. 2, 2010

(65) Prior Publication Data
US 2011/0175892 A1 Jul. 21, 2011

(30) Foreign Application Priority Data
Jan. 18, 2010 (KR) .................. 10-2010-0004350

(51) Int. Cl.
| | |
|---|---|
| G06F 3/038 | (2013.01) |
| G09G 3/30 | (2006.01) |
| G06F 1/00 | (2006.01) |
| G09G 3/36 | (2006.01) |
| H02M 3/155 | (2006.01) |

(52) U.S. Cl.
CPC ........ *G09G 3/3696* (2013.01); *G09G 2330/021* (2013.01); *H02M 3/155* (2013.01)
USPC .............................. 345/212; 345/76; 713/300

(58) Field of Classification Search
USPC .................. 345/211, 87, 98; 363/17; 713/300
See application file for complete search history.

(56) References Cited

U.S. PATENT DOCUMENTS

| 6,636,431 B2 | 10/2003 | Seki et al. |
| 7,319,600 B2 | 1/2008 | Lee et al. |
| 7,565,559 B2 * | 7/2009 | Chapuis ........................ 713/300 |
| 2006/0018132 A1 * | 1/2006 | Price et al. ...................... 363/17 |
| 2006/0114191 A1 * | 6/2006 | Choi ............................... 345/76 |

FOREIGN PATENT DOCUMENTS

| JP | 03-259218 | 11/1991 |
| JP | 2001-188518 | 7/2001 |
| JP | 2002-238250 | 8/2002 |
| JP | 2008-293731 | 12/2008 |
| JP | 2009-210816 | 9/2009 |
| JP | 2009-217239 | 9/2009 |
| KR | 1020020044092 | 6/2002 |
| KR | 100523378 | 10/2005 |
| KR | 1020060072731 | 6/2006 |
| KR | 1020070091919 | 9/2007 |

(Continued)

*Primary Examiner* — Kumar Patel
*Assistant Examiner* — Kuo Woo
(74) *Attorney, Agent, or Firm* — F. Chau & Associates, LLC (57) ABSTRACT

A power source circuit includes an inductor, a reservoir capacitor, and a switching control part that generates ON/OFF control signals to each of first and second switches. The first switch is connected between a first power voltage terminal and a first node to form a first current path between the first power voltage terminal and the first node in response to a driving signal of the switching control part. The second switch is connected between the first node and a second power voltage terminal to form a second current path between the first node and the second power voltage terminal in response to the driving signal. The inductor is connected to the first node to provide an average voltage between the first power voltage terminal and the second power voltage terminal. The capacitor is connected in parallel with the inductor to store the average voltage.

10 Claims, 6 Drawing Sheets

(56) References Cited

FOREIGN PATENT DOCUMENTS

| | | |
|---|---|---|
| KR | 1020080017191 | 2/2008 |
| KR | 1020080080272 | 9/2008 |
| KR | 1020090059501 | 6/2009 |

* cited by examiner

FIG. 4B $$V_{out} = \frac{1}{1-D1} V_{in} (0 < D1 < 1)$$

# POWER SOURCE CIRCUIT AND LIQUID CRYSTAL DISPLAY APPARATUS HAVING THE SAME

PRIORITY STATEMENT

This application claims priority, under 35 U.S.C. §119, of Korean Patent Application No. 2010-4350, filed on Jan. 18, 2010 in the Korean Intellectual Property Office (KIPO), the contents of which are incorporated by reference herein in their entirety.

BACKGROUND OF THE INVENTION

1. Field of the Invention

Exemplary embodiments of the present invention relate to a power source circuit and a liquid crystal display apparatus having the power source circuit. More particularly, exemplary embodiments of the present invention relate to a power source circuit in which power consumption is reduced and a liquid crystal display apparatus having the power source circuit.

2. Description of the Related Art

A liquid crystal display ("LCD") apparatus generally includes an LCD panel including a lower substrate having a plurality of pixel electrodes, an upper substrate having a common electrode facing the lower substrate and a liquid crystal layer disposed between the lower substrate and the upper substrate. The LCD panel includes a plurality of gate lines, a plurality of data lines, and a plurality of pixels connected to the gate lines and the data lines.

In order to drive the pixels in the LCD panel, the LCD apparatus includes a gate driving circuit for sequentially outputting a gate pulse to the gate lines and a data driving circuit for outputting a pixel voltage to the pixels through the data lines. Generally, the gate driving circuit and the data driving circuit are be formed as one driving chip to be mounted on a film or on a peripheral area of the LCD panel.

Figure 1:
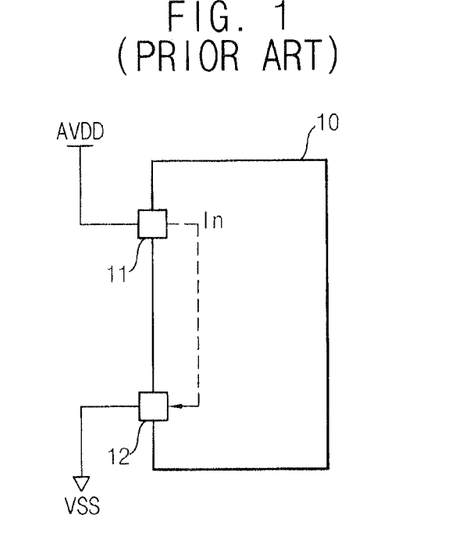
FIG. 1 is a schematic diagram illustrating a conventional method of providing current to a conventional driving chip.

FIG. 1 is a schematic diagram of an example of providing current to a conventional driving chip of an LCD panel.

Referring to FIG. 1, the driving chip 10 includes a first power terminal 11 and a second power terminal 12. An analog power voltage AVDD is applied to the power terminal 11 of the driving chip 10, and a ground voltage VSS is applied to the second power terminal 12 of the driving chip 10. When current flowing through the first power terminal 11 is IA (In=IA), power consumption of an LCD panel is defined as AVDD×IA. Also, power consumption of the driving chip 10 is defined as AVDD×IA.

As LCD panels have been manufactured with increasingly large-scaled size, their power consumption has also increased and so various efforts for driving the LCD panel in a high speed has been developed so as to enhance image display quality. In order to enhance image display quality, the voltage level of the analog power voltage AVDD has been increased. For example, when the analog power voltage AVDD is about 15 V, the voltage difference between the analog power voltage AVDD and a ground voltage VSS increases which causes power consumption to increase. The increased power consumption may induce an increase of the operation temperature of the LCD panel that may cause an operation error in the LCD apparatus.

SUMMARY OF THE INVENTION

An aspect of the invention provides an L-C voltage divider that reduces a power supply voltage without the losses inherent with a Resistor-based voltage divider. Thus, exemplary embodiments of the present invention provide a power source circuit in which power consumption is reduced.

Exemplary embodiments of the present invention also provide a liquid crystal display ("LCD") apparatus having the above-mentioned power source circuit.

According to one aspect of the present invention, a power source circuit includes a switching control part, a first switch, a second switch, an inductor and a capacitor. The switching control part generates on/off control signals to control the conductive state of each of the first and second switches. The first switch is connected between a first power voltage terminal and a first node to form a first current path between the first power voltage terminal and the first node in response to a driving signal of the switching control part. The second switch is connected between the first node and a second power voltage terminal to form a second current path between the first node and the second power voltage terminal in response to the driving signal. The inductor is connected to the first node to provide an average voltage between the first power voltage terminal and the second power voltage terminal. The capacitor is connected in parallel with the inductor to store the average voltage.

According to another aspect of the present invention, an LCD apparatus includes a data driving circuit and a power source circuit. The data driving circuit includes a first terminal, a second terminal and a third terminal. The power source circuit provides first and second power voltages and the output voltage at the first node to the first to third terminals. The power source circuit includes a switching control part, a first switch, a second switch, an inductor and a capacitor. The switching control part generates on/off control signals to control the conductive state of each of the first and second switches. The first switch is connected between a first power voltage terminal and a first node to form a first current path between the first power voltage terminal and the first node in response to the first on/off control signal of the switching control part. The second switch is connected between the first node and a second power voltage terminal to form a second current path between the first node and the second power voltage terminal in response to the second on/off control signal. The inductor is connected to the first node to provide an average voltage between the first power voltage terminal and the second power voltage terminal. The capacitor is connected in parallel with the inductor to store the average voltage.

According to some exemplary embodiments of the present invention, an operation error of a driving chip may be prevented, which would otherwise occur due to an increase of an operation temperature.

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of circuit elements may be exaggerated for clarity.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. As used herein, the term "and/or" includes any and all combinations of one or more of the associated listed items.

It will be understood that, although the terms first, second, third etc. may be used herein to describe various elements, components, regions, and/or sections, these elements, components, regions, and/or sections should not be limited by these terms. These terms are only used to distinguish one element, component, region, layer or section from another region or section. Thus, a first element, component, region or section discussed below could be termed a second element, component, region or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings, in which like numerals refer to like elements.

BRIEF DESCRIPTION OF THE DRAWINGS

The above and other features and advantages of the present invention will become more apparent by describing detailed exemplary embodiments thereof with reference to the accompanying drawings, in which.

DETAILED DESCRIPTION OF THE INVENTION

Figure 2:
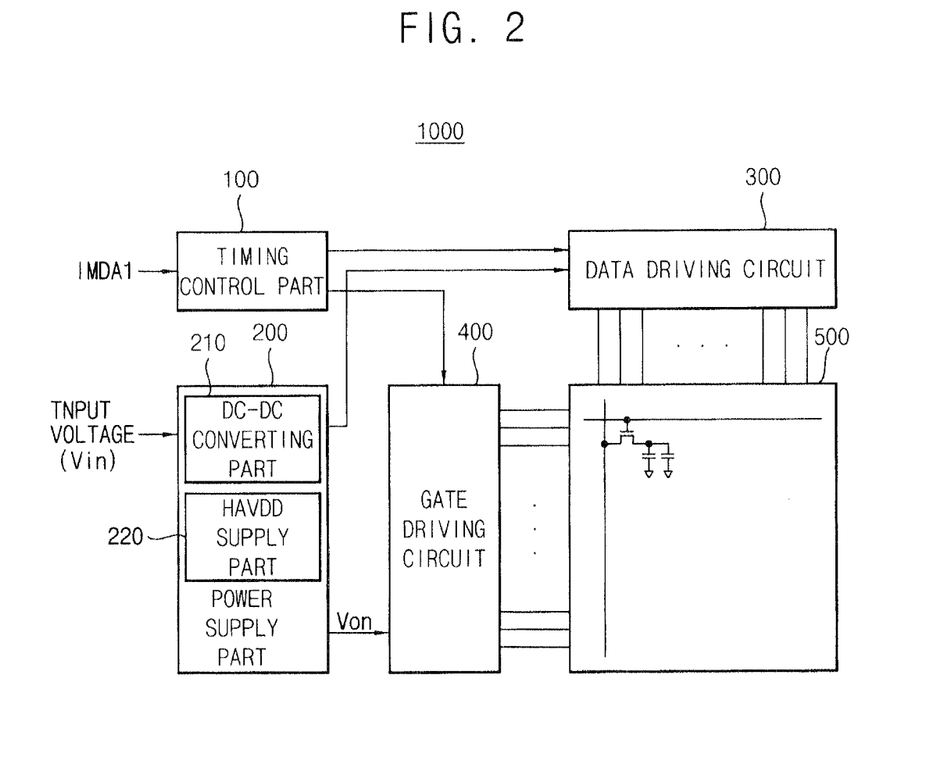
FIG. 2 is a block diagram of a liquid crystal display (LCD) apparatus 1000 according to an exemplary embodiment of the present invention.

FIG. 2 is a block diagram of a liquid crystal display (LCD) apparatus 1000 according to one exemplary embodiment of the present invention.

Referring to FIG. 2, an LCD apparatus 1000 according to an exemplary embodiment of the present invention includes a timing control part 100, a power supply part 200, a data driving circuit 300, a gate driving circuit 400 and an LCD panel 500.

The timing control part 100 controls the data driving circuit 300 and the gate driving circuit 400 in response to an image data signal (e.g., digital image data signals R, G and B) provided from an external device (not shown). For example, the timing control part 100 receives a first image data IMDA1 from an external device. For example, the first image data IMDA1 may include a first red image data signal, a first green image data signal and a first blue image data signal. The timing control part 100 generates a gate control signal in response to the first image data IMDA1 to provide the gate driving circuit 400 with the gate control signal. The timing control part 100 generates a second image data IMDA2 and a data control signal in response to the first image data IMDA1 to provide the data driving circuit 300 with the second image data IMDA2 and the data control signal. The second image data IMDA2 may include a second red image data signal (R), a second green image data signal (G) and a second blue image data signal (B).

The power supply part 200 supplies a power voltage to the data driving circuit 300 and the gate driving circuit 400. The power supply part 200 receives an input voltage Vin from an external device to generate an analog supply voltage AVDD, a gate-ON voltage Von, a gate-OFF voltage Voff, a gamma voltage, etc. The power supply part 200 supplies the gamma voltage to the data driving circuit 300, and supplies the gate-ON voltage Von and the gate-OFF voltage Voff to the gate driving circuit 400. The analog supply voltage AVDD may be used as operating voltages of various circuit elements of the LCD apparatus 1000. Although not shown in FIG. 2, the power supply part 200 may further generate a common voltage Vcom to provide the LCD panel 500 with the common voltage Vcom.

The power supply part 200 receives an input voltage Vin and includes a DC-DC converting circuit 210, a half analog supply voltage (hereinafter, an HAVDD) supply circuit 220.

The DC-DC converting circuit 210 receives the input voltage Vin to generate an analog supply voltage AVDD. The DC-DC converting circuit 210 may further generate the gate-ON voltage Von and the gate-OFF voltage Voff. The HAVDD supply circuit 220 receives the analog supply voltage AVDD generated by the DC-DC converting circuit 210 to generate a first driving voltage optimized for reducing power consumption by half.

The data driving circuit 300 receives power supply voltage from the HAVDD supply circuit 220 and is operated in response to a control signal and digital image data signals R, G and B from the timing control part 100. The data driving circuit 300 generates analog grey level voltages, which correspond to digital image data signals R, G and B received from the timing control part 100, by using the power supply voltage delivered from the HAVDD supply circuit 220. The data driving circuit 300 provides analog grey level voltages to data lines while a gate-ON voltage Von is applied to gate lines of the LCD panel 500.

The gate driving circuit 400 receives the power supply voltage from the power supply part 200 and operates in response to a control signal from the timing control part 100.

The gate driving circuit 400 receives the gate-ON voltage Von and the gate-OFF voltage Voff from the power supply part 200. The gate driving circuit 400 sequentially provides gate lines of the LCD panel 500 with the gate-ON voltage Von and the gate-OFF voltage Voff in response to a control signal from the timing control part 100. For example, the pixels of the LCD panel 500 according to an exemplary embodiment of the present invention may be implemented as an amorphous silicon gate ("ASG") to be simultaneously formed when the LCD panel 500 is manufactured.

The LCD panel 500 is connected to the data driving circuit 300 through the data lines, and is connected to the gate riving circuit 400 through the gate lines. The LCD panel 500 includes a plurality of liquid crystal cells (pixels) respectively connected to the data line and the gate line. In the LCD panel 500, one internal data line, one internal gate line and a circuit diagram of one liquid crystal cell (pixel) are illustrated in FIG. 2. The LCD panel 500 includes a plurality of liquid crystal cells (pixels) arranged in a matrix. When the gate-ON voltage Von is applied to a gate line, a transistor of each of the liquid crystal cells connected to that gate line are turned ON. When an analog grey level voltage is applied to the data line connected to a liquid crystal cell, the capacitors (LC capacitor and storage capacitor) of the liquid crystal cell are charged with the analog grey level voltage. When the gate-OFF voltage Voff is applied to the gate line, the transistor of each of the liquid crystal cells connected to that gate line is turned OFF. The electric field of the charged storage capacitor in the liquid crystal cell orients the liquid crystal molecules in accordance with the charged voltage to control its light transmittance.

The number of data driving circuits 300 included in the LCD apparatus 100 may be determined by a designer in accordance with the resolution of the LCD panel 500, the number of channels of each driving chip, and the operating frequency, etc. The following Table 1 shows the number of data driving circuits 300 included in the LCD apparatus 1000 designed to have a resolution of full high definition (FHD) of 1920×1080 (i.e., the resolution and the quantity of pixels) when the operation frequency and the number of channels are varied.

TABLE 1

| An operating frequency | 414 channels | 576 channels | 720 channels | 960 channels |
| --- | --- | --- | --- | --- |
| 60 Hz | 14 | 10 | 8 | 6 |
| 120 Hz | 28 | 20 | 16 | 12 |
| 240 Hz | 56 | 40 | 32 | 24 |

For example, when the data driving circuits 300 have 720 channels to be operated at an operating frequency of about 240 Hz, at least twenty-two source driving chips should be included in the LCD apparatus 1000. It is difficult to arrange and fit twenty-two data driving circuits 300 on the limited size of the printed circuit board (not shown) of the LCD apparatus.

When the number of channels of the data driving circuits 300 is increased to 960, the number of source driving chips required for an operating frequency of about 240 Hz is decreased to twenty four. However, as the number of channels of the data driving circuit 300 is increased, ceteris paribus, the operating temperature of the data driving circuit 300 is also increased. For example, when a test operation is performed, an operating temperature of the data driving circuit 300 having 960 channels may exceed 150 degrees Celsius which may be a threshold temperature. Thus, when the number of channels of the data driving circuit 300 is increased, an LCD apparatus capable of minimizing an increase of temperature may be required.

Figure 3:
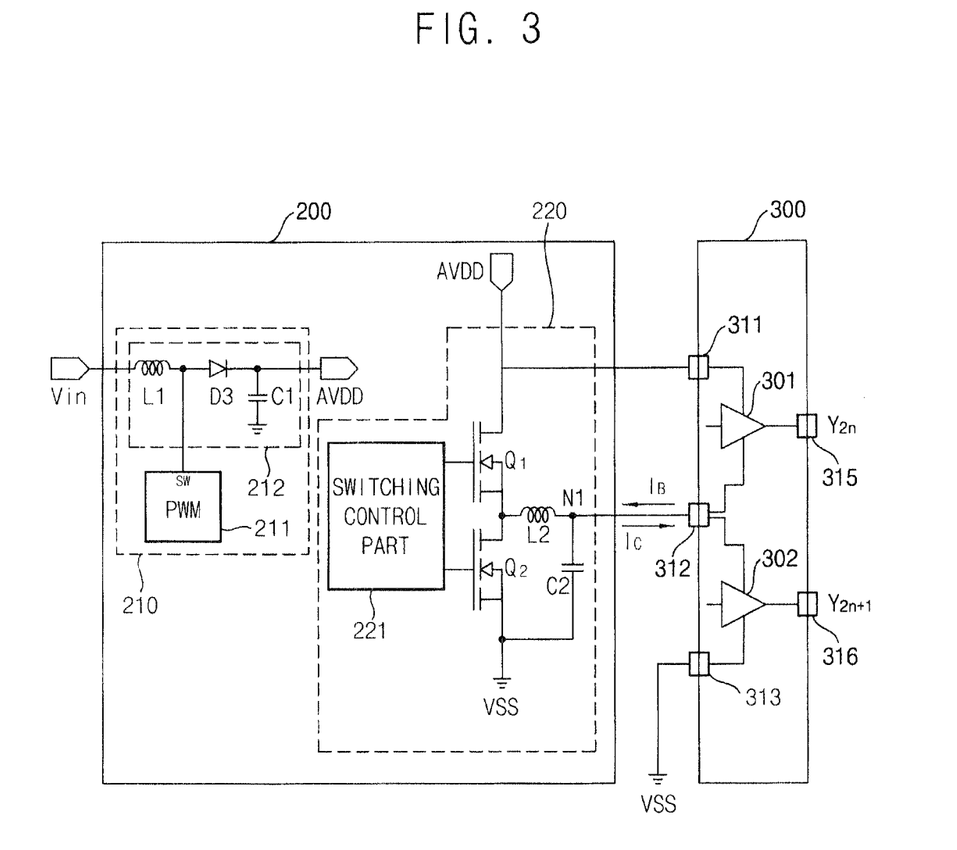
FIG. 3 is a circuit diagram of the power supply part 200 of the LCD apparatus 1000 of FIG. 2.

FIG. 3 is a circuit diagram of the power supply part 200 of the LCD apparatus 1000 of FIG. 2.

Referring to FIG. 2 and FIG. 3, the power supply part 200 of the LCD apparatus according to the present invention includes a DC-DC converter circuit 210 and an HAVDD supply circuit 220.

The DC-DC converter 210 receives an input voltage Vin to generate an analog power supply voltage AVDD. The DC-DC converter 210 may further generate a gate-ON voltage Von and a gate-OFF voltage Voff.

The DC-DC converter 210 may further include a pulse width modulator ("PWM") 211 and a boost converter 212. The DC-DC converter 210 may further include a feedback circuit having a voltage divider (e.g., a plurality of resistors) to receive a voltage divided output voltage thereof at the pulse width modulator in a feedback manner. The pulse width modulator 211 pulse modulates (ON/OFF) the input voltage Vin through the inductor L1, and the boost converter 212 thereby boosts the input voltage Vin to generate an analog supply voltage AVDD.

For example, the pulse width modulator 211 may be operated in response to a start signal (not shown) provided from the timing control part 100 through an enable terminal EN. The pulse width modulator 211 modulates a pulse width in accordance with the start signal. The pulse width modulator 211 may adjust the pulse width the input voltage Vin to output an output pulse in accordance the feedback of an output voltage through the voltage divider (a plurality of resistors) included in a feedback circuit. For example, when the voltage divided output voltage from the feedback circuit is lower than that of a previous state, the pulse width modulator 211 increases the pulse width of the output pulse to be greater than that of a previous state. A switching terminal S/W of the pulse width modulator 211 is connected between the boost converter 212 and a ground voltage. The pulse width modulator 211 may activate a switch (not shown) included therein in accordance with the modulated pulse width to deliver the modulated pulse width to the boost converter 212 through the switch terminal S/W.

The boost converter 212 includes a first inductor L1, a third diode D3 and a first reservoir capacitor C1. The first end terminal of the first inductor L1 is connected to an input voltage Vin, and the second end terminal of the first inductor L1 is connected to the input terminal of the third diode D3. The input terminal of the third diode D3 is commonly connected to the second end terminal of the first inductor L1 and the switching terminal S/W of the pulse width modulator 211. The output terminal of the third diode D3 is connected to the first reservoir capacitor C1. An output of the first reservoir capacitor C1 is used as an analog supply voltage AVDD. The third diode D3 may be a Schottky diode; however, the invention is not limited to that exemplary embodiment.

The HAVDD supply circuit 220 receives the analog supply voltage AVDD from the DC-DC converter 210 to generate a first driving voltage for reducing power consumption by half. The HAVDD supply circuit 220 includes a switching control part 221, a first transistor Q1, a second transistor Q2, an inductor L2 and a second reservoir capacitor C2.

The switching control part 221 is electrically connected to gate electrodes of the first transistor Q1 and the second transistor Q2, respectively. The switching control part 221 delivers alternating (complementary) switching signals to the gate electrodes of the first and second transistors Q1 and Q2. For example, the switching control part 221 delivers a switching signal for turning ON the first transistor Q1 to a gate electrode of the first transistor Q1 for a predetermined time, and simultaneously delivers a switching signal for turning OFF the second transistor Q2 to a gate electrode of the second transistor Q2 for a predetermined time. Next, the switching control part 221 delivers a switching signal for turning OFF the first transistor Q1 to a gate electrode of the first transistor Q1 for a predetermined time, and simultaneously delivers a switching signal for turning ON the second transistor Q2 to a gate electrode of the second transistor Q2 for the same predetermined time. The switching control part 221 may be a pulse width modulator PWM capable of controlling a predetermined ON/OFF duty ratio implementing the predetermined time.

The first transistor Q1 and the second transistor Q2 are connected in series with each other between the analog power voltage AVDD and a ground voltage VSS. The drain electrode of first transistor Q1 is connected to the analog power voltage AVDD and may be commonly connected to a first power terminal 311 of the data driving circuit 300. The source electrode of first transistor Q1 is commonly connected to a drain electrode of the second transistor Q2. The source electrode of the second transistor Q2 is connected to the ground voltage VSS and may be commonly connected to the third power terminal 313 of the data driving circuit 300. Each of the gate electrodes of the first and second transistors Q1 and Q2 is electrically connected to an output terminal of the switching control part 221. In this exemplary embodiment of the present invention, it is described that the first and second transistors Q1 and Q2 are n-type metal-oxide semiconductor field-effect transistors ("NMOS"); however, the invention is not limited to that exemplary embodiment. For one example, the first transistor Q1 may be a p-type metal-oxide semiconductor ("PMOS") field-effect transistor (FET), and a second transistor Q2 may be an NMOS FET. In another example, the first transistor Q1 may be an NMOS, and a second transistor Q2 may be a PMOS. For still another example, the first and second transistors Q1 and Q2 may be PMOS. Moreover, in this exemplary embodiment of the present invention, the analog power voltage AVDD is about 15 V; however, the invention is not limited to that exemplary embodiment.

One terminal of the second inductor L2 is connected to a common connection node of the first transistor Q1 and the second transistor Q2, and the other terminal of the second inductor L2 is commonly connected to one end of a second reservoir capacitor C2. Moreover, another end of the second reservoir capacitor C2 is connected to a ground terminal receiving a ground voltage VSS.

The data driving circuit 300 includes a first power terminal 311, a second power terminal 312, a third power terminal 313, a first amplifier 301, a second amplifier 302, a first output terminal 315 and a second output terminal 316. An analog power voltage AVDD is applied to the first power terminal 311 of the data driving circuit 300, and the second power terminal 312 is connected to a common node N1 of the HAVDD supply circuit 220. The third power terminal 313 is connected to a ground voltage VSS.

By using the first and second transistors Q1 and Q2, a divided voltage VB (an HAVDD voltage that is a voltage divided by the first and second transistors Q1 and Q2) is applied to the common node N1. Thus, an HAVDD voltage that is a voltage divided by the first and second transistors Q1 and Q2 is applied to the second power terminal 312 of the data driving circuit 300. In this embodiment, the HAVDD voltage is AVDD/2. Thus, the first amplifier 301 included in the data driving circuit 300 receives an analog power voltage AVDD and an HAVDD voltage that is a half of the analog voltage AVDD. Moreover, analog power voltage AVDD is applied to the first power terminal 311 of the data driving circuit 300, the HAVDD voltage is applied to the second power terminal 312, and a ground voltage VSS is applied to the third power terminal 313. Therefore, the second amplifier 302 included in the data driving circuit 300 receives an HAVDD voltage that is AVDD/2 and a ground voltage VSS as for a power. In this embodiment of the present invention, the HAVDD voltage is about 7.5 V (i.e., 15V/2); however, the invention is not limited to that exemplary embodiment.

In the LCD apparatus 1000 performing a column inversion driving method of the related art, a two complementary (positive/negative) voltages corresponding to data signals are provided to column lines one during each frame. Therefore, the power supply part 200 according to the previous embodiment of the present invention directly supplies to the data driving circuit 300 a reference voltage VB that is the basis of a polarity inversion driving method.

Figure 4A:
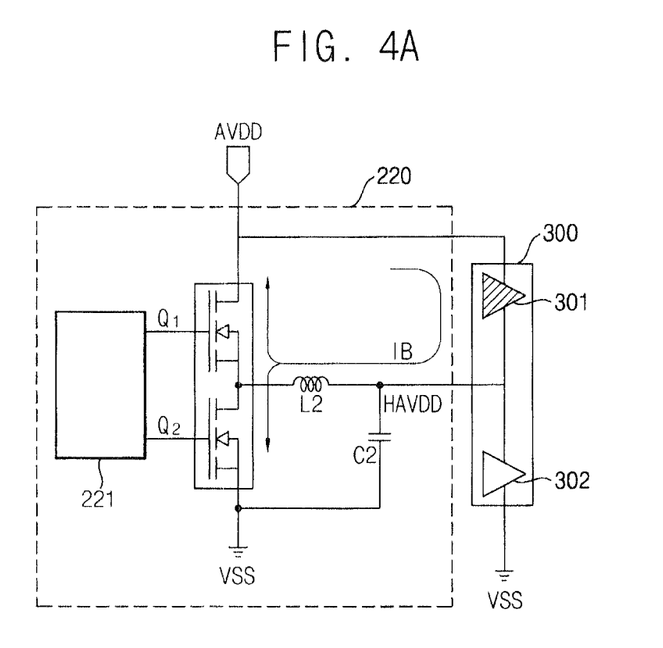
FIG. 4A is a circuit diagram illustrating current flow during a mode of operation when the half analog supply voltage (HAVDD) supply circuit 220 of the power supply part 200 of FIG. 3 is operated as a step-up converter.
Figure 4B:
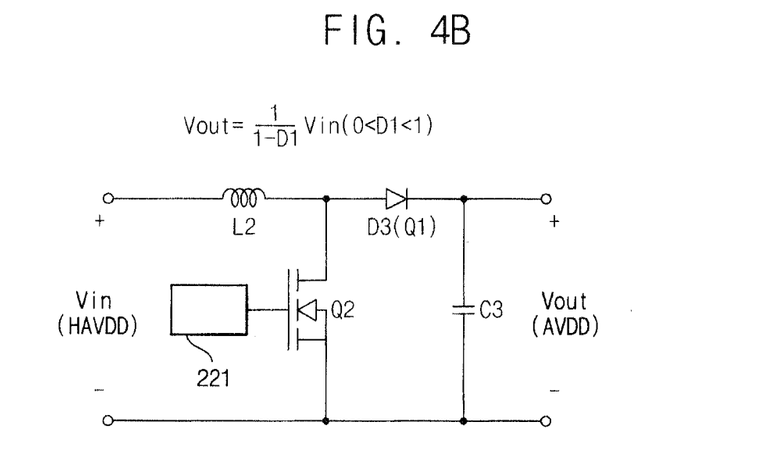
FIG. 4B is an equivalent circuit diagram of the power supply part 220 of FIG. 4A.
Figure 4C:
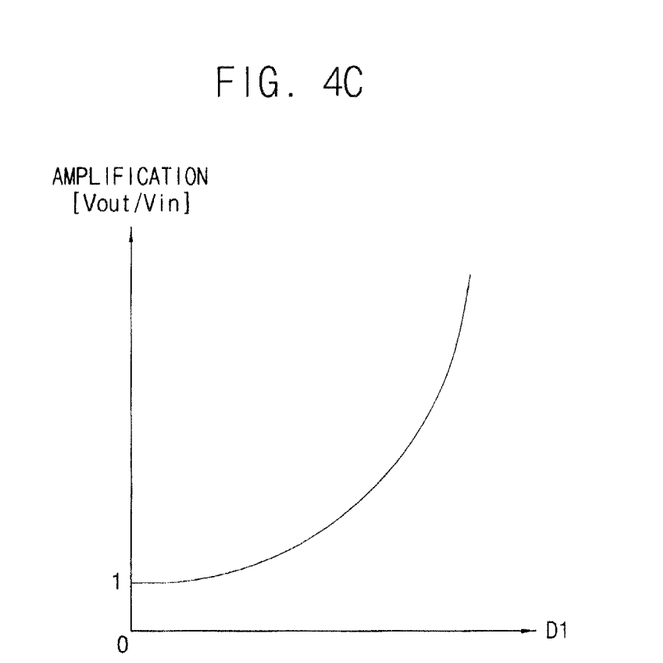
FIG. 4C is a graph showing the output/input amplification ratio (gain) when the HAVDD supply circuit 220 of FIG. 4A is operated as a step-up converter.

FIG. 4A is a circuit diagram illustrating current flow during a mode of operation when the HAVDD supply circuit 220 in the power supply 200 of FIG. 3 is operated as a step-up converter. FIG. 4B is an equivalent circuit diagram of the HAVDD supply circuit 220 of FIG. 4A. FIG. 4C is a graph showing the output/input amplification ratio (gain) when the HAVDD supply circuit 220 of FIG. 4A is operated.

Referring to FIGS. 3, 4A, 4B and 4C, the DC-DC converter 210 delivers the analog power voltage AVDD to the HAVDD supply circuit 220. Here, the switching control part 221 provides the second transistor Q2 with a switching signal having a predetermined ON/OFF duty ratio. In response to the switching signal, the second transistor Q2 is turned ON, and the first transistor Q1 is turned OFF.

When the second transistor Q2 is turned ON, the HAVDD supply circuit 220 may be operated as the equivalent circuit as shown in FIG. 4B. That is, when the second transistor Q2 is turned ON, the HAVDD supply circuit 220 may be operated as a step-up converter. In this embodiment, an input voltage Vin may be a HAVDD voltage, and an output voltage Vout may be an analog supply voltage AVDD.

When the second transistor Q2 is turned ON, the second inductor L2 momentarily accumulates electric current and energy. A current IA is inputted to the first power terminal 311 of the data driving circuit 300 to be amplified by the first amplifier 301, and then a current IB that is amplified by the first amplifier 301 is outputted through the second power terminal 312. A portion of the current IB flows to a ground terminal VSS through the second transistor Q2.

When the second transistor Q2 is turned OFF by a switching operation of the switching control part 221, the first transistor Q1 is turned ON to play the role of the third diode D3 shown in FIG. 4B. At this time, the second inductor L2 outputs electric energy as current accumulated therein. The electric current accumulates and is stored as an electric charge in the third capacitor C3 of the data driving circuit 300, and the stored electric charge is outputted as an output voltage Vout. Here, a relationship between the input voltage, the output voltage and a first duty ratio D1 is defined by the following Equation 1:

$$Vout = \frac{1}{(1-D1)} * Vin, \text{ (wherein, } 0 < D1 < 1\text{)} \qquad \text{Equation 1}$$

Since an input voltage is an HAVDD voltage and an output voltage is an analog power voltage AVDD, a first duty ratio D1 is about 0.5 by Equation 1. In this case, a relationship between the amplification ratio (Vout/Vin) (gain) and a first duty ratio D1 may be as shown in the graph in FIG. 4C. Thus, the HAVDD supply circuit 220 operated as a step-up converter may perform the function of a conventional boost converter.

Figure 5A:
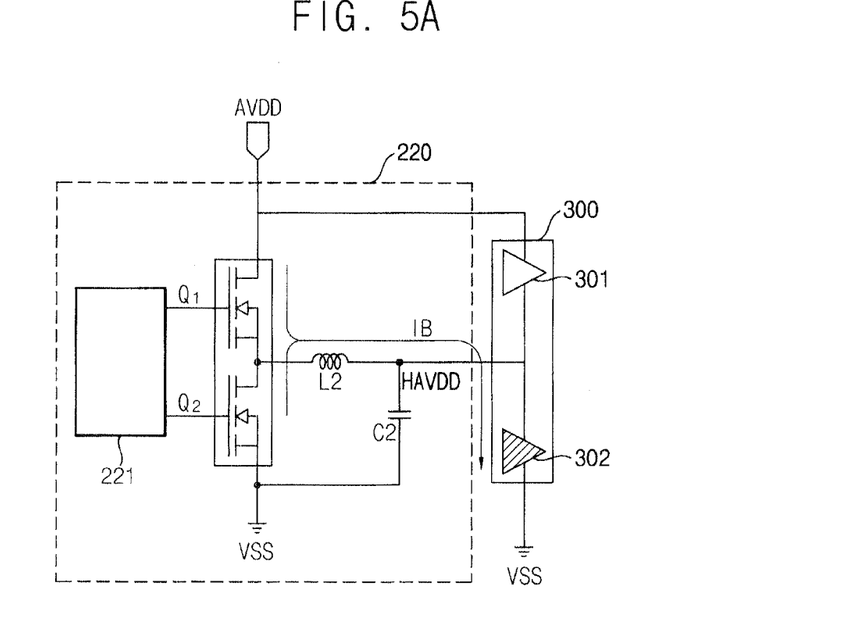
FIG. 5A is a circuit diagram illustrating current flow during a mode of operation when the HAVDD supply circuit 220 of the power supply part 200 of FIG. 3 is operated as a step-down converter.
Figure 5B:
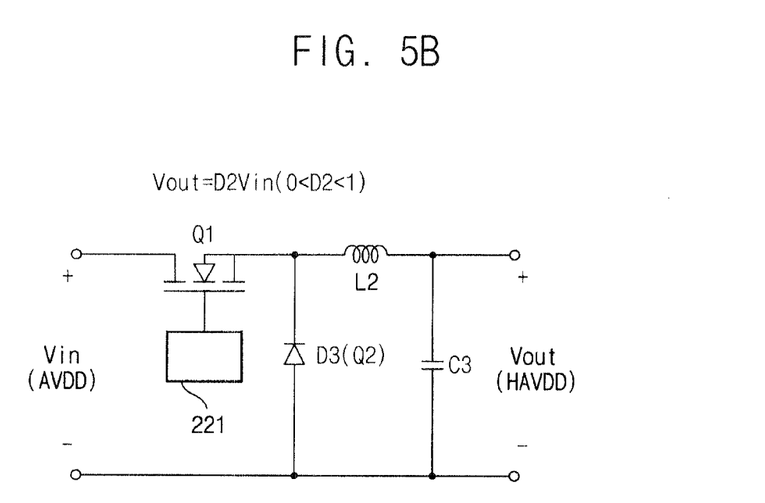
FIG. 5B is an equivalent circuit diagram of step-down converter 220 of FIG. 5A.
Figure 5C:
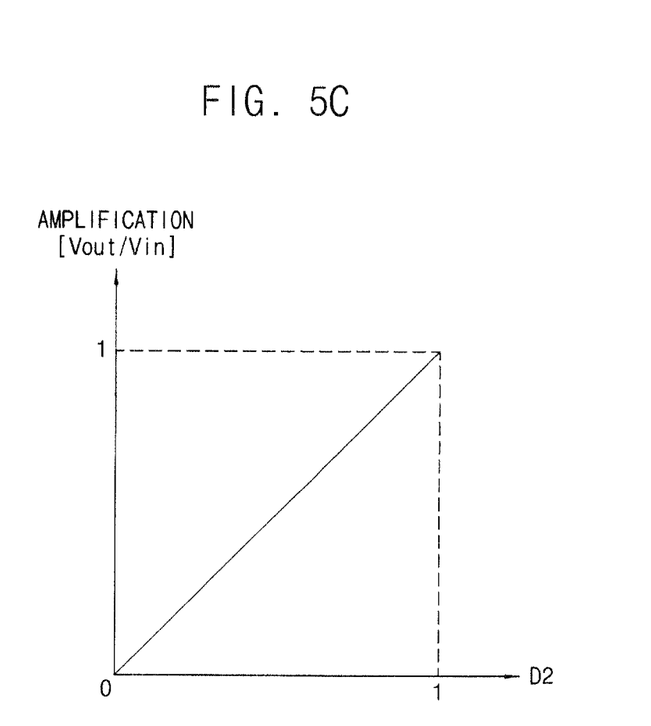
FIG. 5C is a graph showing the output/input amplification ratio (gain) when the HAVDD supply circuit 220 of FIG. 5A is operated as a step-down converter.

FIG. 5A is a circuit diagram illustrating current flow during a mode of operation when the HAVDD supply circuit 220 of the power supply part 200 of FIG. 3 is operated as a step-down converter. FIG. 5B is an equivalent circuit diagram of the step-down converter 220 of FIG. 5A. FIG. 5C is a graph showing an amplification ratio (Vout/Vin) when the HAVDD supply circuit 220 of FIG. 5A is operated as a step-down converter.

Referring to FIGS. 3, 5A, 5B and 5C, when the first transistor Q1 is turned ON, the HAVDD supply circuit 220 is operated as an equivalent circuit such as FIG. 5B. Thus, when the first transistor Q1 is turned ON, the HAVDD supply circuit 220 is functions as a step-down converter. In this case, the input voltage Vin of the HAVDD supply circuit 220 is the analog power voltage AVDD, and an output voltage Vout of the HAVDD supply circuit 220 is the HAVDD voltage.

Then, the switching control part 221 provides the first transistor Q1 with a switching signal having a predetermined duty ratio. In accordance with the switching signal, the second transistor Q2 is turned OFF while the first transistor Q1 is turned ON.

When the first transistor Q1 is turned ON, the second inductor L2 momentarily accumulates electric current and energy. At this time, a current of IC is inputted to the second power terminal 312 of the data driving circuit 300 to be amplified by the second amplifier 302, and then the current IC that is amplified by the second amplifier 302 is outputted to a ground terminal VSS through the third power terminal 313. When the first transistor Q1 is turned OFF by a switching operation of the switching control part 221, the second transistor Q2 is momentarily turned ON to play the role of the third diode D3 shown in FIG. 5B. At this time, the second inductor L2 outputs the electric current stored therein. The outputted electric current is accumulated as charge in a third capacitor C3 of the data driving circuit 300, and the stored electric charge is outputted as an output voltage Vout. Here, the relationship between the input voltage, the output voltage and a second duty ratio D2 is defined by the following Equation 2. Moreover, a relationship between the amplification ratio (Vout/Vin) and a second duty ratio D2 may be as shown in the graph in FIG. 5C.

$$Vout = D2 * Vin, (\text{wherein}, 0 \prec D2 \prec 1) \quad \text{Equation 2}$$

Since an input voltage is an analog power voltage AVDD and an output voltage is an HAVDD voltage, a second duty ratio D2 is about 0.5 by Equation 1. In this case, the relationship between the amplification ratio (Vout/Vin) and a second duty ratio D2 may be as shown in the graph in FIG. 5C. Thus, the HAVDD supply circuit 220 operated as a step-down converter may function as a conventional buck converter.

The first duty ratio D1 in equation 1 (of FIG. 4B) corresponds to the second transistor Q2. The second duty ratio D2 in equation 3 (of FIG. 5B) corresponds to the first transistor Q1. The first transistor Q1 and the second transistor Q2 are in a reciprocal relationship. Thus, when the first duty ratio D1 is determined, the second duty ratio D2 is defined as 1−D1=D2 so that the HAVDD supply circuit 220 is operated at a point where the second duty ratio D2 is about 0.5. As a result, the HAVDD supply circuit 220 is optimally operated by a switching signal having a duty ratio of about 0.5 that is outputted from the switching control part 221. In alternative embodiments, the switching control part maintains the first duty ratio as the inverse of the second duty ratio, and/or keeps one of switches Q1 and Q2 OFF, to minimize a shorting of current through switches Q1 and Q2 between voltages AVDD and VSS.

Due to the HAVDD supply circuit 220, the power consumption of the LCD panel 110 may be defined as VDD×(IB×IC), and the power consumption of the data driving circuit 300 may be defined as (AVDD−VB)×IB+VC×IC=½×AVDD×IA. Thus, the power consumption of the data driving circuit 300 is decreased to about ½ due to a power voltage applied through the HAVDD supply circuit 220 in comparison with the power consumption of the conventional method shown in FIG. 1.

Figure 6:
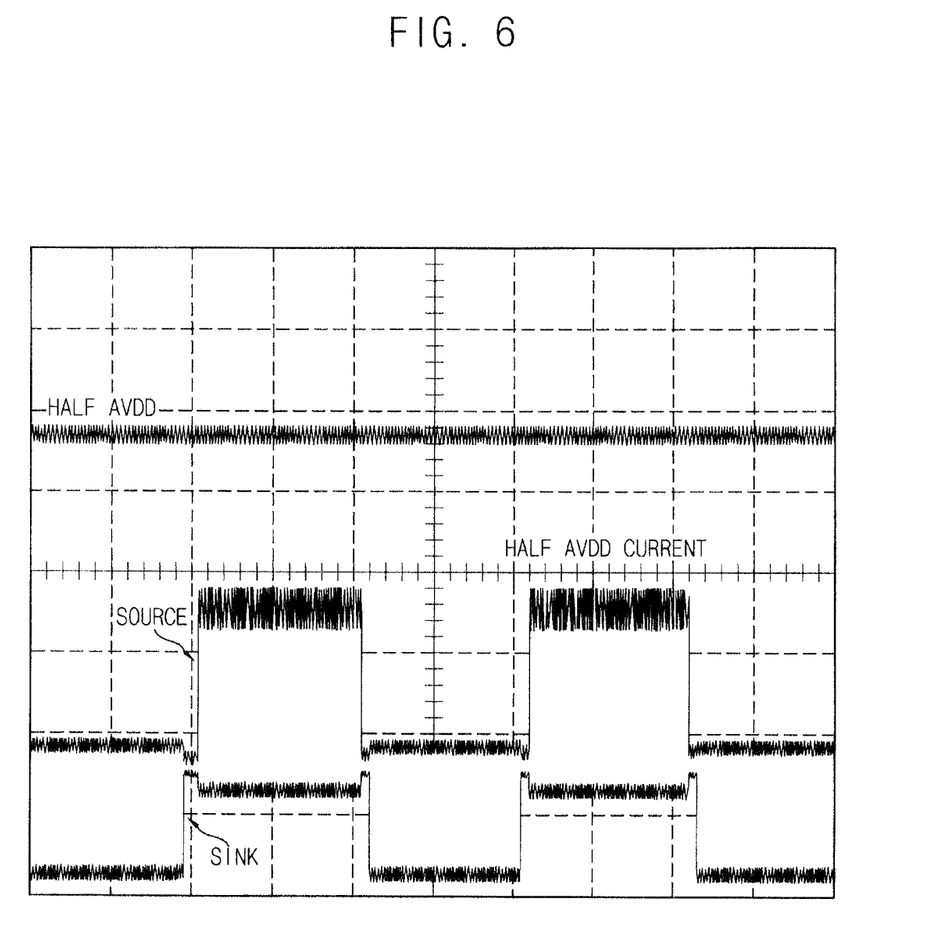
FIG. 6 is a waveform diagram showing the relationship between input voltage and current of the HAVDD supply circuit 220 of FIG. 3.

FIG. 6 is a waveform diagram showing a relationship between a voltage and current of the HAVDD supply circuit 220 of FIG. 3.

Referring to FIGS. 3 and 6, the output current is determined by a sink function of a step-up converter mode and a source function of a step-down converter mode, and when output voltage and an output current are stably maintained the HAVDD supply circuit 220 is normally operated.

As a result, the HAVDD supply circuit 220 supplies a power voltage that is a half of an analog power voltage AVDD to the data driving circuit, so that power consumption may be reduced.

According to the present invention, an operation error of a driving chip that would otherwise be generated by an increase of an operation temperature may be prevented. Moreover, a half power voltage HAVDD that is a half of an analog power voltage AVDD is provided to the data driving circuit, so that power consumption may be reduced.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific exemplary embodiments disclosed, and that modifications to the disclosed exemplary embodiments, as well as other exemplary embodiments, are intended to be included within the scope of the appended claims. The present invention is defined by the following claims, with equivalents of the claims to be included therein.

What is claimed is:

1. A liquid crystal display ("LCD") apparatus comprising:
a data driving circuit comprising a first terminal, a second terminal and a third terminal, wherein a first power voltage is applied to the first terminal and a third power voltage is applied to the third terminal; and
a power source circuit directly connected to the second terminal to provide a second power voltage to the second terminal, the power source circuit comprising:
a first node;
a first switch connected between a first power voltage terminal and the first node;
a second switch connected between the first node and a second power voltage terminal;
an inductor connected between the first node and an output node of the power source circuit;
a reservoir capacitor connected to the output node and to one of the first power voltage terminal and the second power voltage terminal; and a switching control part generating a first ON/OFF control signal to control the first switch and a second ON/OFF control signal to control the second switch, wherein the data driving circuit further comprises:
- a first amplifier directly connected to the first terminal and the second terminal;
- a second amplifier directly connected to the second terminal and the third terminal;
- a first output terminal directly connected to the first amplifier; and
- a second output terminal directly connected to the second amplifier.

2. The LCD apparatus of claim 1, wherein the data driving circuit comprises a plurality of output terminals corresponding to a plurality of column lines, respectively, and the data driving circuit drives the output terminals with a column inversion method.

3. The LCD apparatus of claim 1, wherein the power source circuit further comprises a DC-DC converter that receives an input voltage from an external device to generate the first power voltage.

4. The LCD apparatus of claim 3, wherein the first switch comprises a first MOSFET receiving the first ON/OFF control signal.

5. The LCD apparatus of claim 4, wherein the first MOSFET is an N-type MOSFET.

6. The LCD apparatus of claim 3, wherein the second switch comprises a second MOSFET receiving the first ON/OFF control signal.

7. The LCD apparatus of claim 6, wherein the second MOSFET is an N-type MOSFET.

8. The LCD apparatus of claim 1, wherein the switching control part switches the first switch with a first duty ratio, and switches the second switch with a second duty ratio, and
  the first duty ratio is about 0.5 and the second duty ratio is 0.5.

9. The LCD apparatus of claim 8, wherein the switching control part comprises a first pulse width modulator to generate the first ON/OFF control signal and a second pulse width modulator to generate the first ON/OFF control signal.

10. A power source circuit comprising:
  a first stage component, configured to receive a first input voltage and to generate a first power voltage, including:
    a first node and a first output node;
    a first inductor connected between to the first node;
    a first switch connected to the first node;
    a first reservoir capacitor connected indirectly to the first node and connected to the first output node; and
    a first switching control part generating a first ON/OFF control signal to control the first switch; and
  a second stage component, configured to receive the first power voltage and to generate an output voltage at a second output node serving as the output node of the power source circuit, including:
    a second node and the second output node;
    a second switch connected between the first power voltage at the first output node and the second node;
    a third switch connected between the second node and a second power voltage terminal;
    a second inductor connected between the second node and the second output node and configured to provide an second output voltage equal to or greater than the first power voltage at the first output node;
    a second switching control part generating a second ON/OFF control signal to control the second switch and a third ON/OFF control signal to control the third switch; and
    a second reservoir capacitor connected to the output node.

* * * * *